Dec. 21, 1937. F. THIELE Re. 20,601

SNAP FASTENER

Original Filed Sept. 4, 1934

Inventor
Frank Thiele

By Miller & Miller
Attorneys

Reissued Dec. 21, 1937 Re. 20,601

UNITED STATES PATENT OFFICE 20,601

SNAP FASTENER

Frank Thiele, Brooklyn, N. Y., assignor, by mesne assignments, to Dependable Tuft Corporation, Philadelphia, Pa., a corporation of Delaware Original No. 2,013,528, dated September 3, 1935, Serial No. 742,686, September 4, 1934. Application for reissue December 21, 1936, Serial No. 118,011

2 Claims. (Cl. 24—90)

This invention relates to a snap fastener and has for an object to provide an improved snap fastener of the type which, when once fastened, is intended to remain permanently fastened, as for instance, when used in tufting mattresses, cushions and the like.

A further object of this invention is to provide a snap fastener which may be quickly and easily assembled to use and, when once assembled, remains permanently assembled.

Still a further object of this invention is to provide a snap fastener in which metal parts are manufactured economically and inexpensively by a simple stamping operation out of pressed metal and in which a fabric part is assembled with one of the metal parts by pressing the metal part around the fabric part.

Still a further object of this invention is to provide a snap fastener including a button and a male member adapted to be assembled to the button, the male member having a flexible fabric or string member secured thereto.

An additional object of this invention is to provide a tufting device for mattresses which includes a snap fastener member formed at each end of a flexible fabric member of suitable size for tufting operation.

With the foregoing and other objects in view, as will hereinafter become apparent, this invention comprises constructions, combinations and arrangements of parts hereinafter set forth, disclosed and shown on the accompanying drawing. In this drawing.

Figure 1:
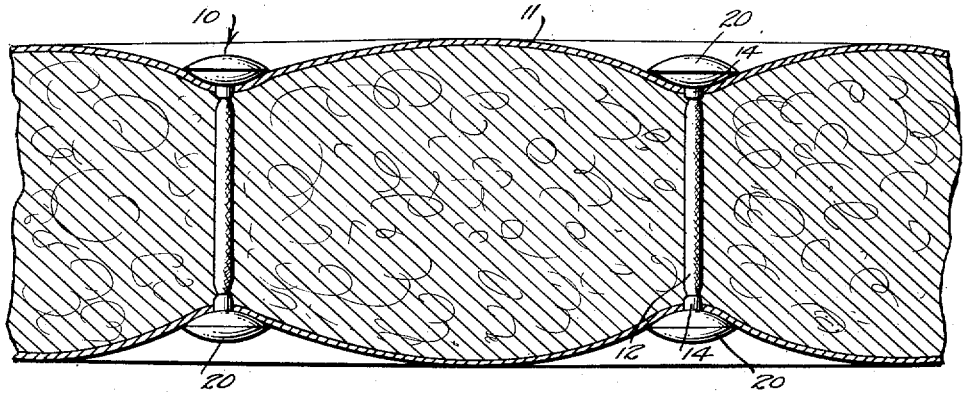
Fig. 1 is a sectional view of a mattress embodying this invention.

There is shown at 10 the snap fastener of this invention embodied as a tufting device in the mattress 11. The snap fastener 10 includes a flexible fabric or string member 12, to each end of which the fastening means may be attached, the fastening means at each end being identical.

A male member 14 is secured to an end of the flexible fabric 12 by having the end of the flexible fabric 12 inserted in the hollow tubular portion thereof and then having the edge of the tubular portion 14 crimped or pressed thereabout as at 15 to securely fasten the flexible fabric 12 to the male member 14. At the other end the male member 14 is formed with a reduced neck 16 to which it attached at its base 17 a cone-shaped head 18. This male member 14 may be constructed of an integral solid piece of metal in the same manner as tooth-paste tubes are constructed, that is, a cylindrical block of metal of the proper size is pressed until a hollow tube is formed partly therein at one end, then at the other end it is stamped to cause the metal to flow into the reduced neck 16 to which is attached the cone-shaped head 18. The flexible fabric 12 is then inserted in the hollow end thereof and the edge 15 is crimped or pressed thereabout.

Figure 3:
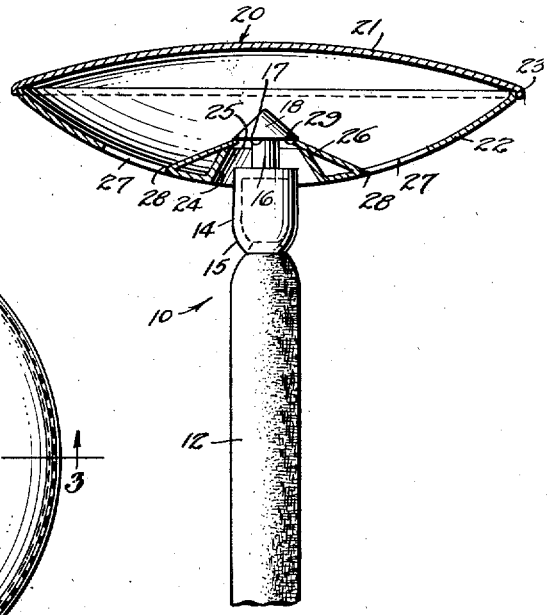
Fig. 3 is a sectional view taken on the line 3—3 of Fig. 2.
Figure 2:
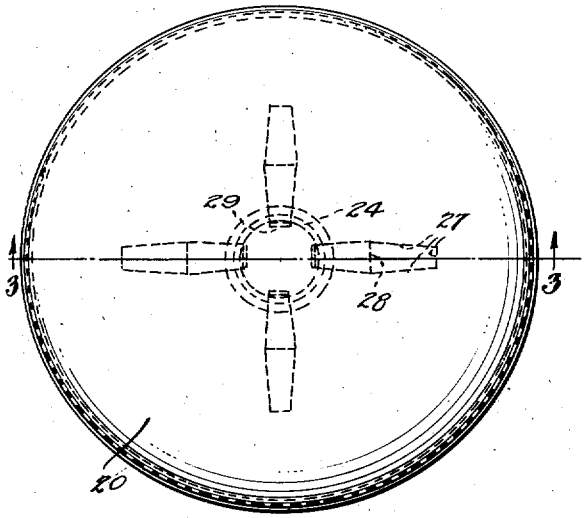
Fig. 2 is a top plan view of one of the fasteners.

As shown in Fig. 1, a similar or identical male member 14 is secured to each end of the fabric member 12. A tufting button 20 is provided to cooperate with each male member 14, tufting button 20 being formed, as will be clear from Fig. 3, of two metal portions 21 and 22 pressed together along their meeting edges 23.

In the center of the side 22 of the button 20, a collar 24 is pressed inwardly, the collar 24 terminating in a circular edge 25 of a diameter equal to a circle slightly larger than the maximum diameter of the head 18.

Surrounding the base of the collar 24 a plurality of elongated fingers or prongs 26 are struck outwardly on three sides 27 but are attached to the metal 22 along the fourth side 28. The fingers 26 are curved backwardly and their free ends 29 overlap the circular edge 25 of the collar 24. As shown, there are four fingers 26 formed in the metal portion 22 of the button 20 and any convenient number may be formed as desired, two, three or more.

A circle tangent to the free ends 29 of the fingers 26 and their overlapped position is of smaller diameter than the circle about the edge of the base 17 of the cone-shaped head 18. Accordingly, in order to assemble the button 22 on the male member 14 to which the flexible fabric 12 has already been attached, it is only necessary that the cone-shaped head 18 be inserted into the button 20 through the circular edge 25 of the collar 24. As the cone-head 18 is being inserted, its sides will press against the under side of the free end 29 of the fingers 26 until the edge of the base 17 has passed therebeyond. As soon as this happens, the free ends 29 will spring back into their overlapped position against the circular edge 25 of the collar 24, then the base 17 will be on top instead of beneath the free ends 29 and the free ends 29 upon their fingers 26 will thereby secure a hold to male member 14 against being withdrawn through the circular edge 25, it being observed that the fingers 26 and the sides of the base 17 form a very large obtuse angle to each other, thereby preventing any possibility of the male member 14 being withdrawn from the button 20 unless the metals, one or the other, were to shear through.

When using the invention in tufting mattresses, cushions, or the like, the flexible fabric 12 or string is formed with the male member 14 at each end thereof. The button 20 is attached to one male member 14 and then the other male member is drawn through the mattress 11, bringing the first button 20 into contact with one side of the mattress. Then the other side of the mattress is compressed by a suitable tool allowing the other male member 14 to extend a sufficient distance therethrough for the other button 20 to be pressed thereon and snapped into position, it being observed that the neck 16 is of sufficient length to allow the base 17 to extend a sufficient distance beyond the circular edge 25 of the collar 24 in the assembling operation.

The novel features and the operation of this device will be apparent from the foregoing description. While the device has been shown and the structure described in detail, it is obvious that this should not be considered limited to exact form disclosed and that changes may be made therein without departing from the spirit of the invention.

Having thus described my invention, what I claim as new and desire to secure by Letters Patent is:

1. A tufting device for mattresses, cushions and the like, comprising a flexible fabric member, a male member having one end hollow for receiving one end of the flexible fabric member, said hollow end being crimped about said fabric member to securely fasten same together, the opposite end of said male member having a reduced neck terminating in an enlarged cone head, a tufting button adapted to be permanently attached to said male member, said button having an annular dished bottom portion provided with an apertured collar centrally thereof, a plurality of spaced prongs radially of the collar and intermediate the circumference of the button and the collar struck integrally out of said bottom, said prongs being folded back with their free ends overlapping the edge of said collar, whereby the cone head of the male member may extend through the apertured collar beyond the free ends of the prongs and be entrapped by said free ends springing into position below the base of the cone head.

2. A tufting device for mattresses, cushions and the like comprising a flexible member, a male member having one end hollow, one end of said flexible member being inserted and secured to said hollow end of said male member, the opposite end of said male member having a reduced neck terminating in an enlarged cone head, a tufting button adapted to be permanently attached to said male member, said button having an annular dished bottom portion provided with an apertured collar centrally thereof, a plurality of spaced prongs radially of the collar and intermediate the circumference of the button and the collar struck integrally out of said bottom, said prongs being folded back with their free ends overlapping the edge of said collar, whereby the cone head of the male member may extend through the apertured collar beyond the free ends of the prongs and be entrapped by said free ends springing into position below the base of the cone head.

FRANK THIELE.